US012202667B2

(12) United States Patent
Granitz, III

(10) Patent No.: US 12,202,667 B2
(45) Date of Patent: Jan. 21, 2025

(54) MATERIAL COLLECTION AND HANDLING DEVICE

(71) Applicant: David W. Granitz, III, Beaumont, TX (US)

(72) Inventor: David W. Granitz, III, Beaumont, TX (US)

( * ) Notice: Subject to any disclaimer, the term of this patent is extended or adjusted under 35 U.S.C. 154(b) by 173 days.

(21) Appl. No.: 17/727,877

(22) Filed: Apr. 25, 2022

(65) Prior Publication Data

US 2022/0348404 A1 Nov. 3, 2022

Related U.S. Application Data

(60) Provisional application No. 63/181,092, filed on Apr. 28, 2021.

(51) Int. Cl.
*B65F 1/10* (2006.01)
*B65F 1/00* (2006.01)
*B65F 1/14* (2006.01)

(52) U.S. Cl.
CPC .............. *B65F 1/10* (2013.01); *B65F 1/0006* (2013.01); *B65F 1/1415* (2013.01); *B65F 1/1452* (2013.01); *B65F 2240/138* (2013.01)

(58) Field of Classification Search
CPC ........ B65F 1/10; B65F 1/0006; B65F 1/1415; B65F 1/1452; B65F 2240/138
See application file for complete search history.

(56) References Cited

U.S. PATENT DOCUMENTS 3,739,561 A * 6/1973 Boudeman ............. A01D 46/22
56/329
4,200,127 A * 4/1980 Dunleavy ........... B65B 67/1238
141/10
4,471,600 A * 9/1984 Dunleavy ........... B65B 67/1238
53/469
5,271,589 A * 12/1993 Belous ................ B65B 67/1238
248/97
5,913,496 A * 6/1999 Valdez ................ B65B 67/1233
248/97
6,708,742 B2 * 3/2004 Weathers .............. B65F 1/1415
141/391

(Continued)

FOREIGN PATENT DOCUMENTS

GB 2386359 A * 9/2003 ......... B65B 67/1238
GB 2479876 A * 11/2011 ............. B65D 88/16

*Primary Examiner* — Nicolas A Arnett
(74) *Attorney, Agent, or Firm* — Jeffrey L. Streets

(57) ABSTRACT

An apparatus includes a flexible sheet of material having a perimeter edge and a central opening forming a discharge chute, and first and second clips coupled to the flexible sheet for securing an open end of a bag around an outer circumferential surface of the discharge chute, wherein the first and second clips are spaced apart about the outer circumferential surface of the discharge chute. With the discharge chut inserted into the bag and the bag secured to the clips, the flexible sheet is laid on the group and debris or other solid materials may be raked, shoveled, or otherwise placed on the flexible sheet. Raising the flexible sheet, such as by lifting with handles around a perimeter edge, causes the debris to pass through the discharge chute and into the bag. The size of the apparatus may be adapted for the application, such as leaf collection or sandbag preparation.

20 Claims, 11 Drawing Sheets

(56) References Cited

U.S. PATENT DOCUMENTS

| | | | | |
|---|---|---|---|---|
| 7,219,705 | B2 * | 5/2007 | Wallek | B65F 1/141 141/340 |
| 7,490,787 | B1 * | 2/2009 | Salazar | B65F 1/10 241/285.2 |
| 7,984,733 | B2 * | 7/2011 | Noonan | B65F 1/10 141/337 |
| 9,701,444 | B2 * | 7/2017 | Gallagher | B65D 5/60 |
| 10,131,458 | B2 * | 11/2018 | Williams, Sr. | B65B 39/007 |
| 2006/0232082 | A1 * | 10/2006 | Tiura | B65F 1/10 294/214 |
| 2008/0205973 | A1 * | 8/2008 | Drawdy | B65F 1/00 402/80 L |
| 2011/0277883 | A1 * | 11/2011 | Noonan | B65F 1/00 29/428 |
| 2012/0168574 | A1 * | 7/2012 | Urbanczyk | B65F 1/10 248/99 |
| 2021/0051862 | A1 * | 2/2021 | Sharkey | B65F 1/0006 |

* cited by examiner

MATERIAL COLLECTION AND HANDLING DEVICE

CROSS-REFERENCE TO RELATED APPLICATIONS

This application is a nonprovisional patent application claiming the benefit of U.S. provisional patent application Ser. No. 63/181,092 filed on Apr. 28, 2021, which application is incorporated by reference herein in its entirety.

BACKGROUND

The present disclosure relates to devices, systems and methods for collecting and depositing a material into a bag, container or pile.

BACKGROUND OF THE RELATED ART

A common problem in various environments is the removal of debris, such as leaves, trash, particulates, construction or demolition materials, and other materials. For example, many homeowners will spend a considerable amount of time racking leaves from their yard into a pile, only to then face the challenge of getting the leaves into a garbage bag or other container for removal to a composting site or other form of disposal. Furthermore, construction contractors may have a variety of scrap materials that need to be collected for disposal. In this process, the user may sometimes need to collect enough debris in one spot before placing the debris into a container. Either with leaves or scrap materials, a person may need to lift small amounts of the collected debris with a rake or shovel and then drop the small amount of debris into an open garbage bag or container. This process of lifting and dropping into the bag or container must be repeated until either all of the debris has been transferred or until the bag or container is full.

In other situations, a particulate material may be loaded into bags for a useful purpose other than debris or waste removal. A primary example of this situation is the preparation of sandbags for flood mitigation efforts. It can take considerable effort to shovel sand into a bag, especially if a single individual is performing this task on their own. Without someone to hold the bag open during the filling process, the bag is very difficult to keep upright and open during filling.

BRIEF SUMMARY

Some embodiments provide an apparatus comprising a flexible sheet of material having a perimeter edge and a central opening forming a discharge chute, and first and second clips coupled to the flexible sheet for securing an open end of a bag around an outer circumferential surface of the discharge chute, wherein the first and second clips are spaced apart about the outer circumferential surface of the discharge chute.

DETAILED DESCRIPTION

Figure 1A:
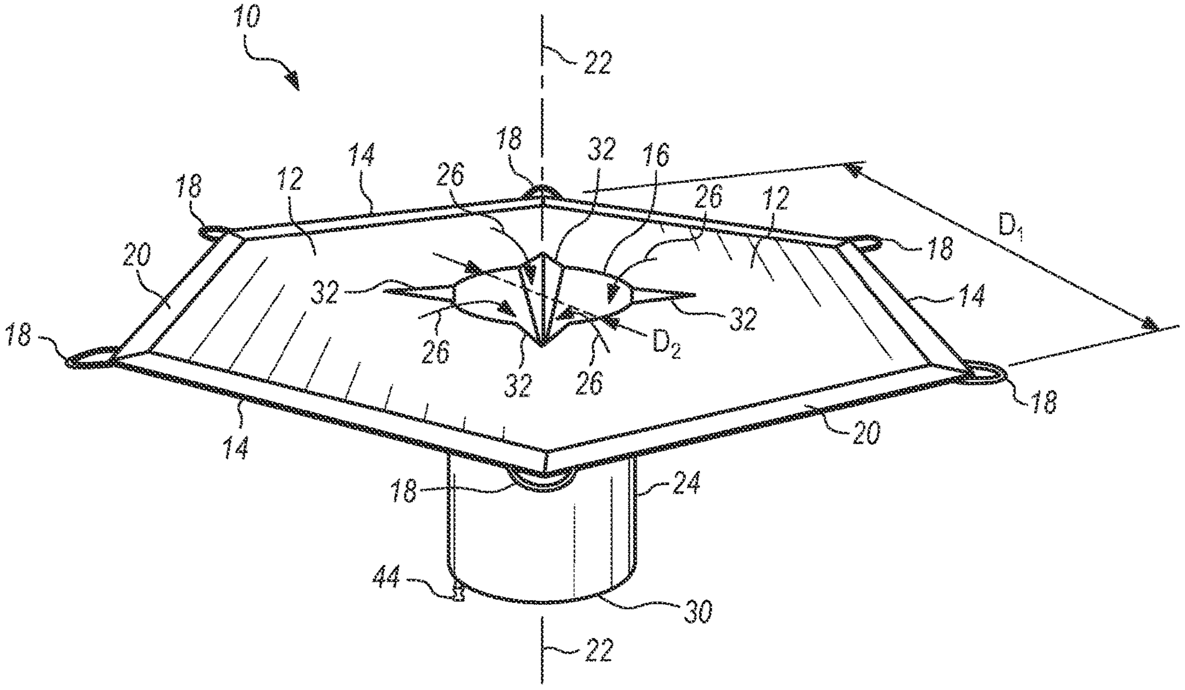
FIGS. 1A-B are upper and lower perspective views of an apparatus according to one embodiment.

Some embodiments provide an apparatus comprising a flexible sheet of material having a perimeter edge and a central opening forming a discharge chute, and first and second clips coupled to the flexible sheet for securing an open end of a bag around an outer circumferential surface of the discharge chute, wherein the first and second clips are spaced apart about the outer circumferential surface of the discharge chute.

The flexible sheet of material is thin relative to the area of the sheet and may be foldable without requiring force. In some embodiments, the flexibility of the sheet of material may be similar to that of a fabric or tarp so as to lay relatively flat over a surface, such as a grassy yard or solid flooring. In some embodiments, the flexible sheet is made with a material selected from plastic, ripstop nylon, polytarp, burlap, canvas, goretex-type material and combinations thereof. Optionally, the flexible sheet may be water resistant, waterproof, inelastic or elastic, high strength, abrasion resistant, tear resistant, ultraviolet resistant, durable, lightweight, and combinations thereof. It may be beneficial in some embodiments for the flexible sheet to have some extent of stretchability and/or expandability, especially in the area of the flexible sheet where there is a transition to the discharge chute. The flexible sheet may have sufficient strength to support the weight of any debris or other solid matter, either wet or dry, during lifting and/or carrying. For example, a flexible sheet of material for gathering and bagging leaves may be made from a thin plastic film, whereas a flexible sheet of material for transporting broken concrete may be made from woven nylon or other high strength materials. In one option, a top surface of the flexible sheet of material, which is intended to be in contact with solid matter being collected during use, may be formed, treated or coated to have a low coefficient of friction (i.e., may be slick) to facilitate sliding of the solid matter over the surface of the flexible sheet and through the discharge chute. Any seams between two sections or portions of the flexible sheet of material may also be made to withstand a significant amount of weight, such as 75 to 100 pounds, through repeated use. For example, any seams may be sewn and/or thermal bonded. As a non-limiting example, a tarpaulin or tarp may be a large sheet of strong, flexible, water-resistant or water-proof material, often cloth such as canvas or polyester cloth that has been coated with polyurethane, or may be made of plastics such as polyethylene or polyvinyl chloride. An inexpensive modern tarpaulin may be made from woven polyethylene, which may be referred to as polytarp.

In some embodiments, the flexible sheet of material may have a perimeter edge that includes curved edges and/or straight edges. For example, the perimeter edge may be a circle or a polygon, such as a circle or regular polygon having a central axis that aligns with the discharge chute. In other words, the discharge chute may be generally centered in the central area of the flexible sheet of material, but this is not required.

In some embodiments, the discharge chute may be cylindrical with a cross-section (substantially perpendicular to an axis of the discharge chute) that is circular, elliptical, polygonal, or similar shape that defines a chute or channel through which matter may be guided as it falls or drops. Furthermore, the shape of the discharge chute may be varied and/or irregular. For example, the discharge chute may include an upper (proximal) transitional section that has a greater diameter or dimension than a lower (distal) section that extends into the bag. In one option, the discharge chute may have a proximal section (closest to the flexible sheet) that includes pleats or is frustoconical in shape, while the distal section (furthest from the flexible sheet) forms a right circular cylinder chute. However, the one or more shape of the discharge chute may also be selected to compliment a shape of a bag or other container into which the solid matter is to be discharged. Furthermore, the one or more shape of the discharge chute may be selected with due consideration for the size, shape and variation in the solid matter to be transferred through the discharge chute. The discharge chute may extend into the bag (or other container) and along the inner sides of the bag, such that the length of the discharge chute may vary according to the range of bag sizes to be used. However, one non-limiting example of the discharge chute may have a distal end that extends at least six inches beyond the first and second clips that secure a top end of the bag so that solid matter is directed into the bottom of the bag and will not fall through any gap between the distal end of the discharge chute and the open top end of the bag.

In some embodiments, the first and second clips may be directly coupled to the flexible sheet by a fastener, such as a rivet, or may be indirectly coupled to the flexible sheet using a tie or tether, such as a strap or cord. Coupling the clips to the flexible sheet of material with a tie or tether may be beneficial in providing a greater range of motion over which the clips may be used. So, the clips on a tie or tether may reach radially inward to reach the open edge of a smaller bag and may reach outward to reach the open edge of a larger bag. The center point of this range of motion may be selected to accommodate the most common sized bag for the intended application. For example, clips that are coupled with a strap having a length of 3-5 inches will allow the clips to secure bags that have a greater range of diameters without putting stress on the bag or the clips. Each clip preferably has strong enough grip to hold the bag as the solid matter falls into the bag. Furthermore, each clip may grip the bag over a broad area of the bag so that the clip does not tear or otherwise damage the integrity of the bag. Accordingly, the clips may have a wide mouth with jaws that have a wide surface area and no sharp corners.

In some embodiments, the apparatus may include any number of two or more clips secured to the flexible sheet of material about the outer circumference of the discharge chute. For example, the apparatus may include the first and second clips as described above but may further include at least one additional clip coupled to the flexible sheet for securing an open end of a bag around the outer circumferential surface of the discharge chute. For any total number of clips, each of the clips may optionally be spaced about the circumference of the discharge chute at substantially equal spacings or angular placements. Accordingly, each clip may be used to grip and support a portion of the upper end of a bag, which may be a common lightweight plastic trash bag, a thick plastic construction trash bag, a reusable canvas or burlap sack, or other types of open container. In one specific example, if the apparatus is to be used on a construction jobsite where the solid matter being collected into a bag may include sheetrock, wood chunks, nails, plaster, concrete, and the like, then the clips must be larger and provide a stronger gripping force on the upper end of the bag due to the greater potential weight of solid matter. In some embodiments, the clips may be a heavy duty, rust proof, outdoor grade type of clip, and may be made of metal, plastic, and/or rubber. The clips preferably are comfortable to the hands when opening and closing the jaws of the clip, and the opposing gripping surfaces may be corrugated or flat so that the surface area for grabbing the bags is as great as possible to prevent tearing and slipping of the bag. Some clips may have two opposing gripping surfaces having various dimensions and total surface area, such as about 1 inch×2 inches or about 2 inches×2 inches, perhaps 2 inches to 4 inches in one or more dimension, and may have a jaw that opens to about 0.5 inch to 3 inches. One preferred style of clip for gripping the bag is a tarp clip.

In some embodiments, the flexible sheet of material may include a first sheet portion from the perimeter edge to the central opening and a second sheet portion that forms the discharge chute. For example, the second sheet portion may be formed into a discharge chute and may have a proximal end that is connected to the first sheet portion along the central opening. The first section can be laid out flat on a support surface with the second section folded under the first section. Optionally, the first sheet portion may be connected to the second sheet portion by sewing and/or thermal bonding, although other types of connections may also be used. The central opening may be circular, but it may also be oval, square, rectangular or other polygonal shapes without limitation. In some embodiments, the flexible sheet may be formed as a single seamless sheet, perhaps having a smooth transition in contour from a first flat area along the perimeter edge to the discharge chute.

In some embodiments, the flexible sheet of material may include one or more features that form a transition between a generally flat first sheet portion and a generally cylindrical second sheet portion. As one example, the transition may be a frustoconical section having a wide proximal end that is connected to the first sheet portion and a narrower distal end that is connected to the second sheet portion that forms the discharge chute. As another example, the transition may include a plurality a pleats that are disposed along a circumference of the central opening, wherein each pleat extends at an acute angle with the first section and at an acute angle with the discharge chute. Both the frustoconical section and the pleats may guide the solid matter toward and into the discharge chute. Depending upon the physical characteristics of the solid matter, the gradual transition provided by a frustoconical section or pleats may improve the flow of the solid matter into the discharge chute.

In some embodiments, the apparatus may include one or more features for securing the flexible sheet of material in a generally flat, spread configuration. In the generally flat, spread configuration, a user may easily deposit solid matter on top of the flexible sheet of material. In one option, the apparatus may include a plurality of weights secured to the perimeter edge of the flexible sheet of material. Such weights may, for example, weigh less than one pound, such as 8 ounces each, and may be spaced about the perimeter edge. The weights may be permanently secured to the perimeter edge or may be temporarily set on the perimeter edge to keep the flexible sheet of material in the generally flat, spread configuration while solid matter is being deposited thereon. Specifically, the first section can be laid out flat on a support surface with the second section folded under the first section, such as with a bag received around the second section (i.e., discharge chute) and connected to the clips. The weights may hold down the perimeter edge of the flexible sheet despite the presence of wind or movement of solid matter across the flexible sheet. In one specific example, bean bag type weights may be secured in locations around the perimeter of the flexible sheet. In another option, the perimeter edge of the flexible sheet of material may be secured in a generally flat, spread configuration using a plurality of stakes that may be drive driven through the flexible sheet and into an underlying substrate, such as a soil bed. For example, the plurality of stakes may be similar to tent stakes. In one implementation, the apparatus may include a plurality of grommets secured through the flexible sheet along the perimeter edge and a plurality of stakes may be receivable through the grommets for securing the flexible sheet to a soil bed. It is not necessary to use stakes in all embodiments or circumstances, but they are helpful when there is a breeze, when a leaf blower is being used, or when the solid matter is being dragged across an edge of the flexible sheet. The stakes may be made with a lightweight plastic or metal material, such as a stake having a wide flat head that can be hit with a tool or stepped on to insert the stake into the ground. Each stake may, without limitation, have a length of about 3 to 6 inches, but may be about 3 to 4 inches long to prevent difficulty inserting or removing the stakes from the ground surface.

In some embodiments, the apparatus includes handles secured along the perimeter edge of the flexible sheet of material. The apparatus preferably includes at least three handles, and more preferably includes about 5 to 7 handles. The flexible sheet may be configured to direct solid matter through the discharge chute in response to lifting the flexible sheet by the handles. For this purpose, three or more handles are preferably located at an equal radial distance from a central axis of the discharge chute and are preferably equally spaced about the perimeter of the flexible sheet. In one example, the apparatus may be characterized in that any solid matter placed onto the flexible sheet may be directed through the discharge chute and into an attached bag in response to lifting the handles so that the discharge chute is raised above the support surface. In some embodiments, the apparatus may include a plurality of handles secured along the perimeter edge of the flexible sheet of material, wherein the perimeter edge of the flexible sheet forms a regular polygon having a plurality of edges and a plurality of vertices, and wherein one of the handles is secured to the perimeter edge of the flexible sheet at each of the vertices. In some further embodiments, the apparatus may further include a hem formed along each of the edges of the polygon, and a cord or woven webbing may extend through the hem, wherein the cord or woven webbing extends from the hem at each of the vertices to form one of the handles. Each handle may be made with a separate section of cord or woven webbing, or the cord or woven webbing may extend between multiple handles. In either case, the cord or woven webbing may be stitched or otherwise secured to the flexible sheet to prevent the cord from pulling out and to distribute the forces of lifting the flexible sheet loaded with solid matter. Alternatively, the handles may have various configurations and/or may be made with various materials. For example, the handles may be preformed plastic handles that are riveted or sewn to the perimeter edge of the flexible sheet. In a further option, the hem may be formed with woven webbing that extends around the entire perimeter of the flexible sheet, where the same woven webbing or additional pieces of woven webbing form the handles.

In some embodiments, the apparatus may further include a first fastener connected to a first side of the discharge chute and a second fastener connected to the flexible sheet at a point on a bottom surface of the flexible sheet that is radially outward of the discharge chute and opposite the first side of the discharge chute. The first fastener may be manually attachable to the second fastener to close off the discharge chute, and the first fastener may be manually detachable from the second fastener to open up the discharge chute. The first and second fasteners may be the two halves of a buckle or clasp, such as a side release buckle. Alternatively, the first fastener may be a carabiner or hook and the second fastener may be a loop or eyelet receiver. The carabiner is preferably heavy duty and rust proof, perhaps made of plastic or aluminum.

In some embodiments, the apparatus may include a concave hood selectively securable to the flexible sheet. The concave hood, alternatively referred to as a tent or net, provides a receptacle or backstop for leaves or other solid matter to be blown into and will retain them in a pile on top of the flexible sheet of material that has been laid out flat on the ground. Optionally, the hood may include two extensions on either side to direct leaves or other solid matter into the area under the hood and above the flexible sheet. Once the blowing is complete, the hood may be detached and removed so that the apparatus can be used as described above.

The apparatus may be used in many applications. For example, the apparatus may be used to collect various types of debris, such as yard and landscape materials and construction or demolition trash. Specific non-limiting examples of yard and landscape materials include all types of leaves (including but not withstanding oak leaves, *magnolia* leaves, maple leaves, and sweet gum leaves), pine needles, pinecones, small sticks and twigs, grass clippings, mulch, composted leaves, rich compost, soil, sand, rocks, shells, pebbles, and flowers. Specific non-limiting examples of construction or demolition trash includes broken sheet-rock pieces, small pieces of wood, wood shavings, nails, screws, insulation, small pieces of wire, scrapped wallpaper, plaster, broken tile, concrete chunks, faucets components, lavatory handles, sink parts, and electrical components. In another example, the apparatus may be used to fill sandbags with sand, such as for the purpose of flood mitigation. In yet another example, the apparatus may be used to collect agricultural products, such as picked fruit and nuts shaken from a tree.

The dimensions and materials used to make the apparatus may be selected in view of the application for which the apparatus is intended. For instance, a first example of the apparatus that may be used to collect construction trash may be larger and be made with more durable materials than a second example of the apparatus that may be used to collect leaves and grass clippings. Furthermore, a third example of the apparatus that may be used to fill sandbags with sand may have a diameter or dimension of about 3 feet whereas the second example of the apparatus that may be used to collect leaves and grass clippings may have a diameter between 4 and 8 feet, between 5 and 7 feet, or about 6 feet. However, a large apparatus for a construction site may have a diameter or dimension varying from 10 to 40 feet, although the later size may require high-capacity straps and commercial strength abrasion and puncture resistant materials so that it can be picked up by a forklift, crane truck or dumpster truck. A specialty apparatus could have a rectangular perimeter to be used as a drop cloth in a room during construction, demolition, remodeling or other messy activities.

Embodiments of the apparatus provide a number of advantages and benefits. For example, the apparatus enables an individual person to fill a bag with solid materials, such as sand or leaves, whereas these jobs may otherwise require two people to be done efficiently. Also, the apparatus may eliminate the need for the individual person to touch the solid materials that are being collected in the bag. This can be advantageous where the solid materials are messy, dirty, contaminated, sharp, or otherwise hazardous to touch. Still further, the apparatus may reduce the amount of time and effort necessary to accomplish a bagging task, such as collecting leaves in the yard. Finally, the apparatus may be used with a range of bag sizes or with no bag at all.

A person having an ordinary level of skill in the art will appreciate that the embodiments provide improvements to various applications by way of making various objects easier to move. Although specific embodiments are illustrated and described herein, it will be appreciated by those having an ordinary level of skill in the art having the benefit of the present disclosure that any arrangement which is intended to achieve the same purpose can be substituted for the specific embodiments shown. This specification is intended to cover any and all adaptations or variations of the disclosed embodiments. In particular, a person having an ordinary level of skill in the art will appreciate that the terminology and names of components are not intended to limit the scope of the embodiments. Furthermore, additional components or features can be added to the apparatus, the components and features of the apparatus may be rearranged, and new components corresponding to materials developed in the future may be introduced without departing from the scope of the embodiments. The terminology used in this application is intended to include all embodiments and alternatives which provide the same functionality as described herein.

Figure 1B:
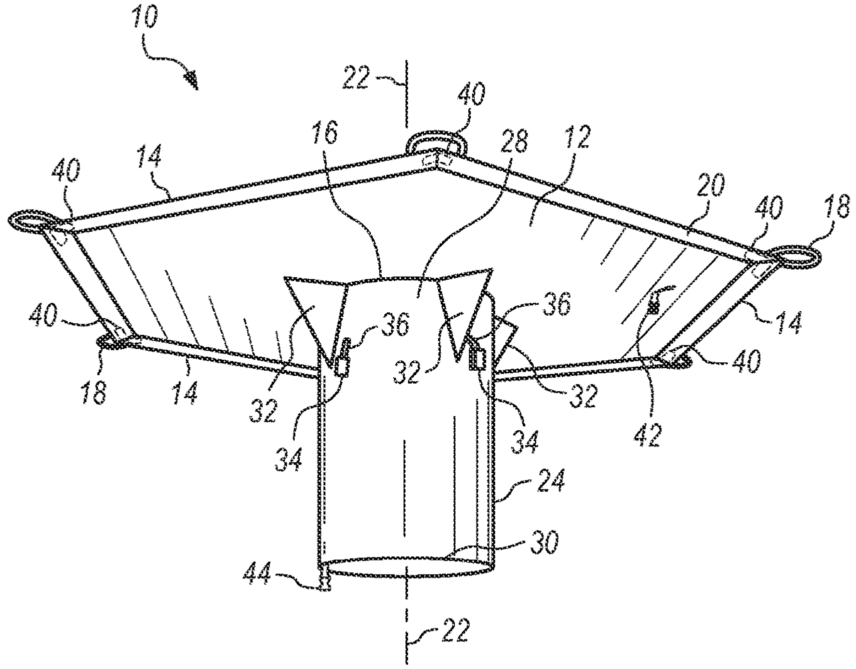

FIGS. 1A-B are upper and lower perspective views of an apparatus according to one embodiment. In FIGS. 1A-B, the apparatus 10 is illustrated as shown for the purpose of understanding the construction of one embodiment of the apparatus, yet the apparatus 10 may never actually be used in the physical arrangement shown. This will become apparent in the discussion of later Figures.

In FIG. 1A, the apparatus 10 includes a generally flat main portion (top) 12 that includes a perimeter edge 14 and a central opening 16. In the embodiment shown, the main portion 12 is a single piece of a flexible sheet of material that has been cut into the shape of a hexagon. For use in collecting leaves or other yard debris, the main portion 12 may have a diameter "$D_1$" of about 6 feet and the central opening (hole) 16 may have a diameter "$D_2$" of about 18 inches.

The apparatus 10 further includes a set of six handles 18 secured to the main portion 12 along the perimeter edge 14. In this embodiment, the handles 18 are located at the vertices of the hexagon. In one option, the perimeter edge 14 may have a hem 20 that reinforces the strength of the perimeter edge 14 and may optionally also provide a channel for reinforcing cord (shown in FIG. 2A). Optionally, a durable woven strap known as "webbing" or "woven webbing" may be used to form at least a portion of the hem 20 along the edge 14 and/or the handles 18. During use of the apparatus, a person may lift the apparatus 10 by gathering each of the handles 18 upward and inward toward the axial centerline 22 of the main portion 12 and/or central opening 16. When the handles 18 have been lifted and gathered in this manner, the person may hold several or all of the handles 18 in one hand for lifting the apparatus so that solid matter resting on the main portion 12 may be directed toward the central opening 16.

The apparatus 10 also includes a downwardly directed discharge chute 24. The purpose of the discharge chute 24 is to allow debris or other solid matter that is initially collected on top of the main portion 12 to be controllably released through the discharge chute 24 (in the direction of arrows 26) by lifting the apparatus 10 by the handles 18. The discharge chute 24 may be shaped as a circular cylinder forming an open passageway therethrough. A proximal (upper) end 28 (see FIG. 1B) of the discharge chute 24 is connected to the edge of the central opening 16 and a distal (lower) end 30 of the discharge chute 24 is directed away from the main portion 12, such as along the central axis 22. The proximal end 28 may be permanently connected to the main portion 12 along the central opening 16 by sewing or thermal bonding. For use in collecting leaves or other yard debris, the discharge chute 24 may have the same diameter "$D_2$" as the central opening 16, such as about 18 inches, and a length (dimension along the central axis 22) between about 1 foot and 3 feet, such as about 30 inches.

In reference to both FIGS. 1A and 1B, the apparatus 10 is shown including four pleats 32, although only portions of three pleats are visible in FIG. 1B. Each of the pleats 32 is sewn or thermal bonded to a triangular cutout in the main portion 12 along the central opening 16 and is also sewn or thermal bonded to a triangular cutout in the proximal end 28 of the discharge chute 24. The pleats 32 enable the proximal end 28 of the discharge chute 24 to open somewhat wider than the diameter of the circular portion of the central opening 16 and full length of the discharge chute 24. Accordingly, the pleats 32 may enable a "funneling effect" within the top portion of the discharge chute 24. Alternatively, the pleats 32 could be replaced with a frustoconical transition between the central opening 16 and the discharge chute 24, but fabrication of a frustoconical transition may be more challenging than the pleats 32. The pleats shown may have a radial length of about 18 inches and may be disposed at generally equal spacings about the central axis 22.

In FIG. 1B, the apparatus 10 is shown having a pair of clips 34, wherein each clip 34 is attached to the discharge chute 24 by a strap 36. Additional clips 34 may be provided around the outer surface of the discharge chute 24 for securing the upper (open) edge of a bag but are not visible in FIG. 1B. The clips 34 are preferably equally spaced about the discharge chute 24, such as two clips 34 located on generally opposite sides of the discharge chute 24 or four clips 34 secured to the four pleats 32. The clips 34, which may also be referred to as clamps, may be spring loaded and may have one or more flat or toothed areas to firmly grip the bag without tearing the bag. One example of the clips 34 is shown further in FIG. 2B and another example is shown in FIGS. 2C-D. It should be recognized that the clips are responsible for securing a bag around the discharge chute 24, but the discharge chute 24 itself as well as solid matter passing through the discharge chute 24 may assist in opening the top of the bag.

The apparatus 10 may also include a weight 40 (shown in dashed lines) stitched to or within the hem 20 at the vertices of the hexagonal perimeter edge 14 of the main portion 12. The weights may be metal or a beanbag type weight and may be stitched in place. The weights may be helpful to hold down the main portion 12 in a spread-out configuration over a surface while leaves or other solid matter are moved on top of the main portion 12.

The illustrated embodiment of the apparatus 10 further includes a side release buckle, which is also known as a parachute buckle. The side release buckle may include an insertion (male) component 42 secured to the bottom surface of the main portion 12 and a receiving (female) component 44 secured to the discharge chute 24. The receiving component 44 is preferably attached to a side of the discharge chute 24 that is opposite from the insertion component 42 and may be attached to the distal end 30 of the discharge chute 24. The insertion component 42 may be located a distance from the discharge chute 24 so that the discharge chute 24 may be folded up flush against the bottom of the main portion 12 and secured in the flush position with the insertion component 42 of the side release buckle coupled to the receiving component 44 of the side release buckle. This is shown in greater detail in FIGS. 8A-8D. Optionally, one component of the side release buckle may be replaced by a loop or eyelet receiver and the other component of the side release buckle may be replaced by a carabiner or hook.

The length of the discharge chute 24 may vary but is preferably long enough to extend down into the bag after the bag is secured to the clips 34 of the apparatus 10. In an embodiment for collecting leaves and other yard debris, the discharge chute 24 may be from 6 inches to 3 feet, such as 32 inches in length. However, the discharge chute 24 preferably does not extend into the bag so far as to lie on the bottom of the bag in a closed off condition and preferably is not so short as to allow the leaves and other yard debris to fall between the distal end 30 of the discharge chute 24 and the opening of the bag.

Figure 1C:
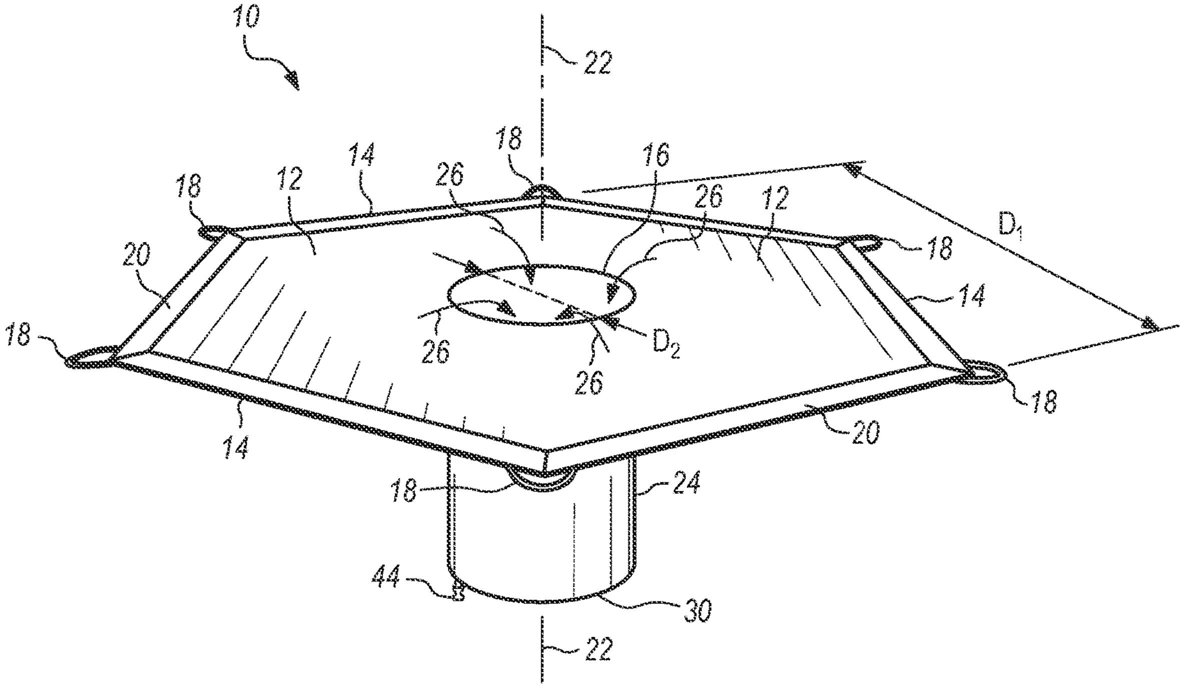
FIGS. 1C-D are upper and lower perspective views of an apparatus according to another embodiment having no pleats.
Figure 1D:
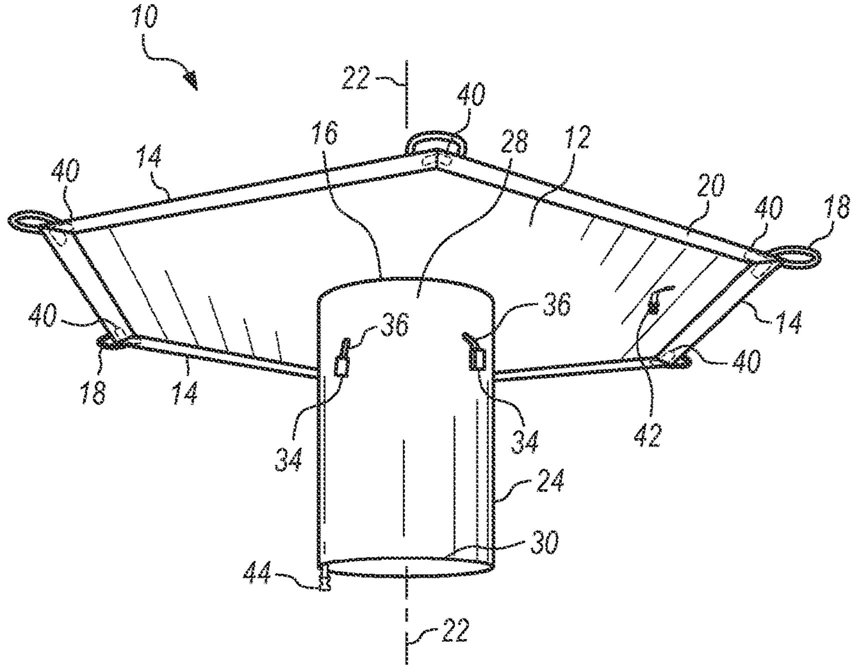

FIGS. 1C-D are upper and lower perspective views of the apparatus 10 according to another embodiment having no pleats 26 (see FIGS. 1A-B). The apparatus 10 in FIGS. 1C-D is otherwise identical to the embodiment shown in FIGS. 1A-B. Without pleats, the discharge chute 24 is generally tubular along its entire length and the central opening 16 in the main portion 12 may be the same as the cross-section profile of the discharge chute 24. Non-limiting examples of the shape of the opening 16 include circular, oval, rectangular, polygonal or similar shaped openings.

Figure 2A:
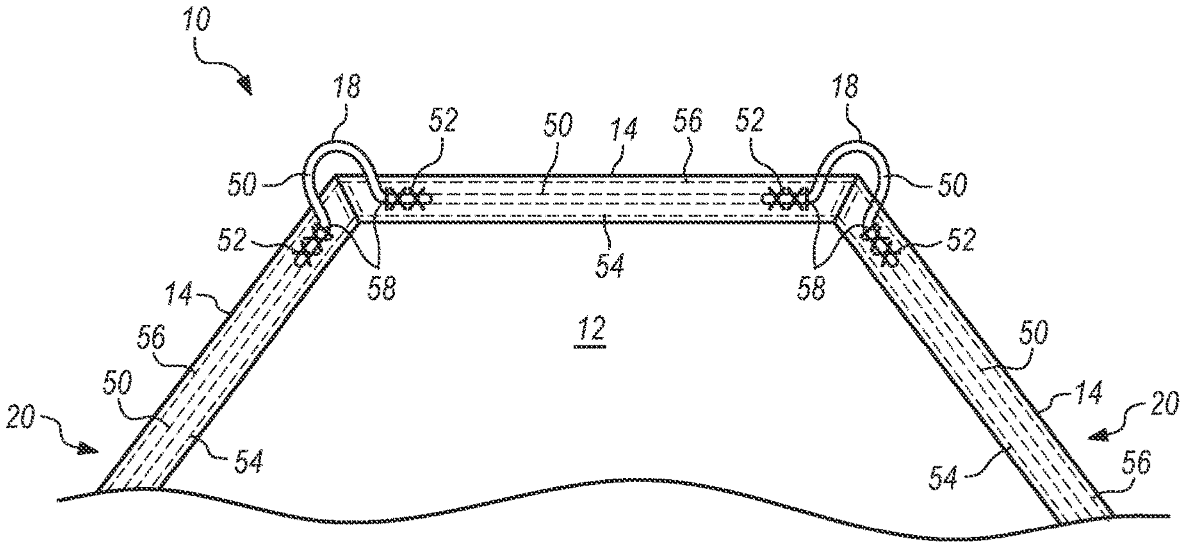
FIG. 2A is a partial plan view of an edge of the apparatus including a pair of handles.

FIG. 2A is a partial plan view of the apparatus 10 with the perimeter edge 14 of the main portion 12 including a pair of handles 18. In this embodiment, each handle 18 is made of a cord, such as a strong rope 50, or woven webbing. The handles 18 are formed with some slack so that they that can be easily grabbed by a hand of a person. The rope or woven webbing 50 may be secured to the main portion 12 with stitches 52 (illustrated as "X"s) or other fasteners to maintain the appropriate amount of slack in the rope or woven webbing 50. In one option, each handle 18 may be made with separate short section of rope or woven webbing. However, in another option, a long continuous section of rope or woven webbing 50 may extend around the perimeter edge 14 of the main portion 12. For example, the hem 20 may include an inner stitch 54 (also shown with an optional outer stitch 56) that forms a channel through the hem 20. The cord, rope or woven webbing 50 may extend through the hem 20 between the stitches 54, 56, then pass through a pair of slits 58 to form one of the handles 18. When the apparatus 10 is lifted by the handles, the rope or woven webbing 50 may distribute the weight of any collected debris or other solid matter over a greater area of the main portion 12 and thereby increase the strength and durability of the apparatus 10. The stitches 52 may be applied to maintain the slack that forms the handles 18 whether or not the handles 18 are made with separate sections of rope or woven webbing 50 or a continuous section of rope 50. Furthermore, both terminal ends of the rope or woven webbing 50 may also be stitched to the main portion 12 in a similar manner. Optionally, the rope or woven webbing 50 may itself provide sufficient weight to hold down the edge of the main portion 12 during use and/or windy conditions. Optionally, the hem 20 may be formed with, or replaced by, woven webbing.

Figure 2B:
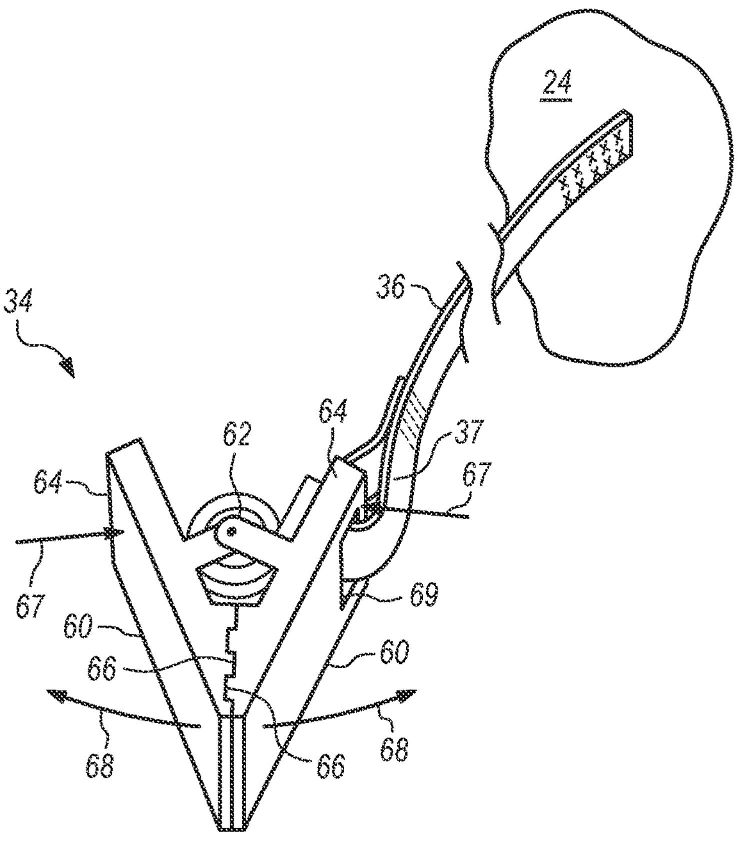
FIG. 2B is a perspective view of a first style of clip secured to a strap.
Figure 2C:
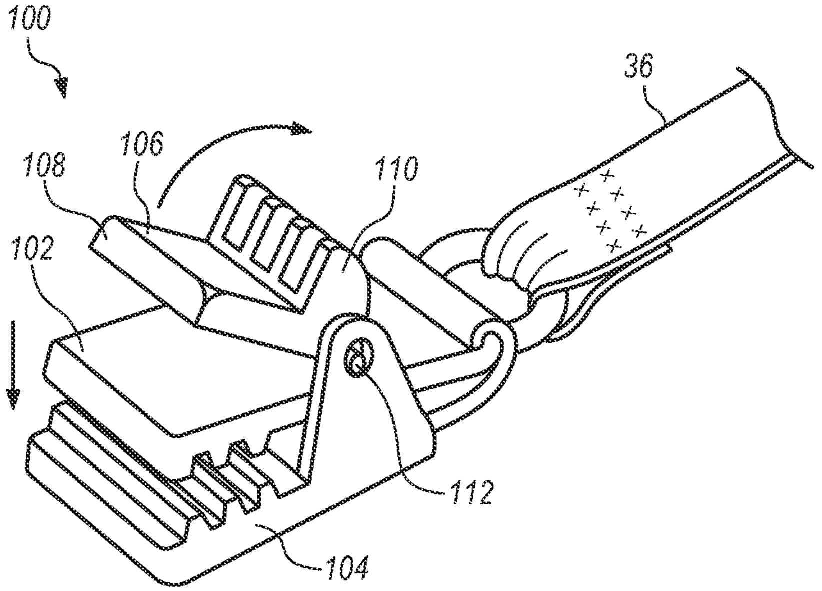
FIGS. 2C-D are perspective views of a second style of clip in an open condition and a closed condition, respectively.
Figure 2D:
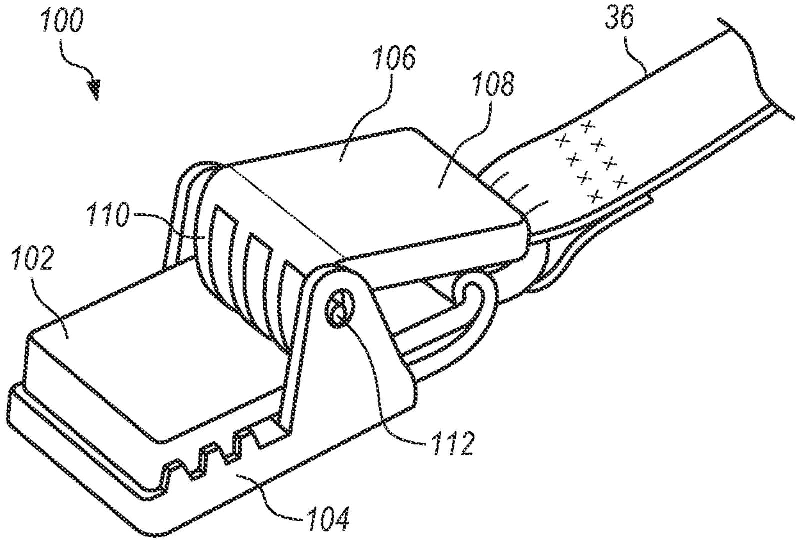

FIG. 2B is a perspective view of an individual clip 34 secured to a strap 36. The clip 34 may include two main structural members 60 that form a hinge 62, a pair of levers 64 and a pair of gripping surfaces 66. Squeezing the two levers 64 together (see arrows 67) cause the members 60 to pivot about the hinge 62 to open the pair of gripping surfaces 66 (see arrows 68). After inserting an open edge of a bag between the open pair of gripping surfaces 66, the force on the pair of levers 64 is released to cause the gripping surfaces 66 to press firmly against both sides of the edge of the bag. One end of the strap 36 forms a loop 37 that is received in an opening 69 in one of the levers 60. Another end of the strap 36 is stitched to the discharge chute 24, perhaps at one of the pleats 32.

FIGS. 2C-D are perspective views of a second style of clip 100 in an open condition and a closed condition, respectively. The clip 100, which may be referred to as a tarp clip, is secured to the strap 36 and may be used in the same manner as the clip 34 of FIG. 2B in any of the embodiments. The clip 100 has a press-lock design that provides a high bite force for securing an edge of a bag. The clip 100 includes upper and lower crocodile jaws 102, 104 with teeth on both the upper and lower jaws. A pivoting lock 106 has a handle portion 108 and an over-center cam portion 110. Pressing the handle portion 108 causes the cam portion 110 to rotate about a pivot point 112 and progressively press further against the upper jaw 102 to press the jaws 102, 104 together. Once the cam portion 110 moves past the center (i.e., rotates about an axis slightly past a point where the cam portion 110 applies a maximum displacement or compression to the upper jaw 102), decompression forces hold the cam portion 110 in a secure position that prevents the cam portion from freely reversing the rotation. However, a user may subsequently use the handle portion 108 to manually force the cam portion 110 to overcome the decompression forces and rotate the cam portion 110 in the reverse direction to release the jaws. The high compression forces of the tarp clip is well-suited to secure an edge of the bag (not shown) between the jaws 102, 104.

Figure 3A:
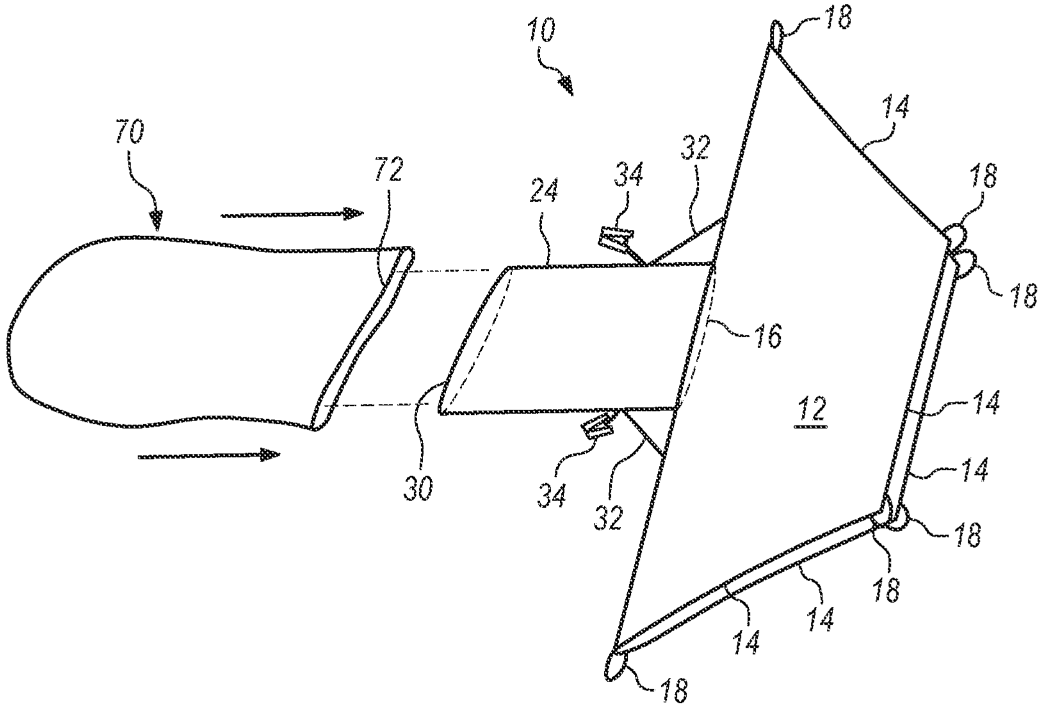
FIG. 3A is a perspective view of the apparatus laid out in a folded condition with a discharge chute aligned with a bag.

FIG. 3A is a perspective view of the apparatus 10 laid out in a folded condition with the discharge chute 24 aligned with a bag 70. One half of the main portion 12 of the apparatus 10 is folded over onto itself, making the discharge chute 24 easily accessible. A bag 70, such as a trash bag, lawn and garden bag, sandbag, or the like, is aligned with its open edge 72 opening toward the distal end 30 of the discharge chute 24.

Figure 3B:
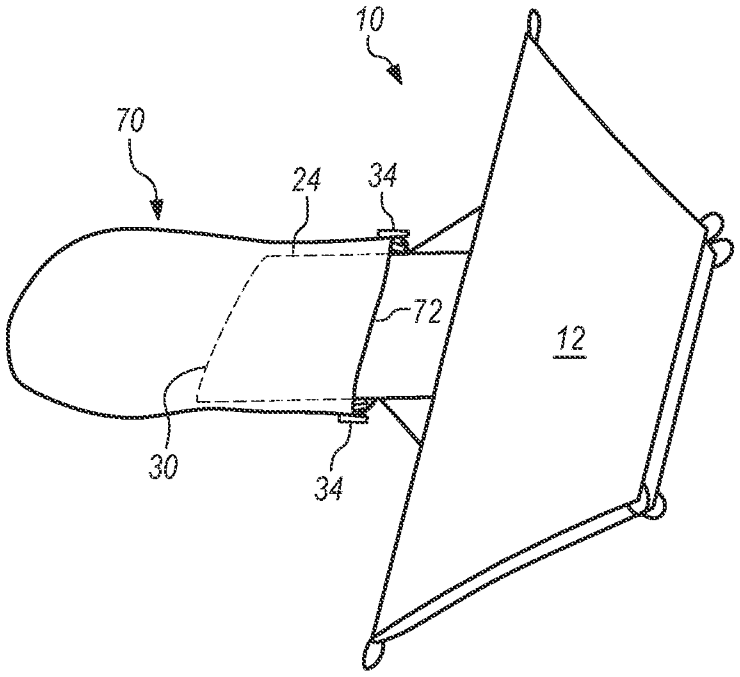
FIG. 3B is a perspective view of the apparatus of FIG. 3A after the bag has been positioned around the discharge chute and secured to the clips.

FIG. 3B is a perspective view of the apparatus of FIG. 3A after the bag 70 has been slid or otherwise positioned around the discharge chute 24. The open edge 72 of the bag 70 has also been secured between the gripping surfaces of the two opposing clips 34. Notice that the distal end 30 of the discharge chute 24 extends into the bag a sufficient distance to prevent escape of debris or other solid matter during transfer into the bag 70.

Figure 3C:
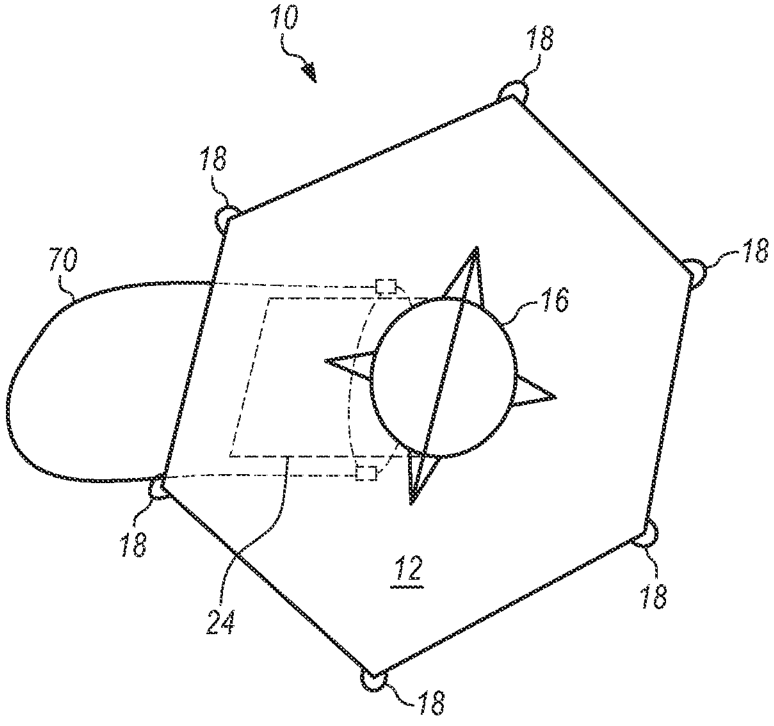
FIG. 3C is a perspective view of the apparatus of FIG. 3B after the main portion has been folded out into a deployed condition.

FIG. 3C is a perspective view of the apparatus 10 of FIG. 3B after the main portion 12 of the flexible sheet of material has been folded out into a deployed condition. Accordingly, the top surface of the main portion 12 is facing upward, ready to have debris or other solid matter placed on the main portion 12. The central opening 16 is visible, but with the apparatus 10 laying flat on the ground or other surface no debris or other solid matter can pass through the central opening 16. Furthermore, the discharge chute 24 and connected bag 70 lay at least partially under the main portion 12 and are closed off.

Figure 4A:
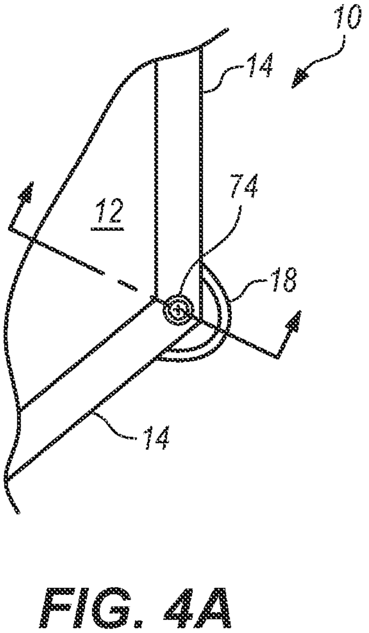
FIG. 4A is a partial plan view of one corner of the apparatus having a grommet forming a hole therethrough.

FIG. 4A is a partial plan view of one corner of the main portion 12 of the apparatus 10 having a grommet 74 forming a hole therein. The grommet 74 may prevent the hole from becoming worn and may have a diameter sufficient to receive a stake therethrough.

Figure 4B:
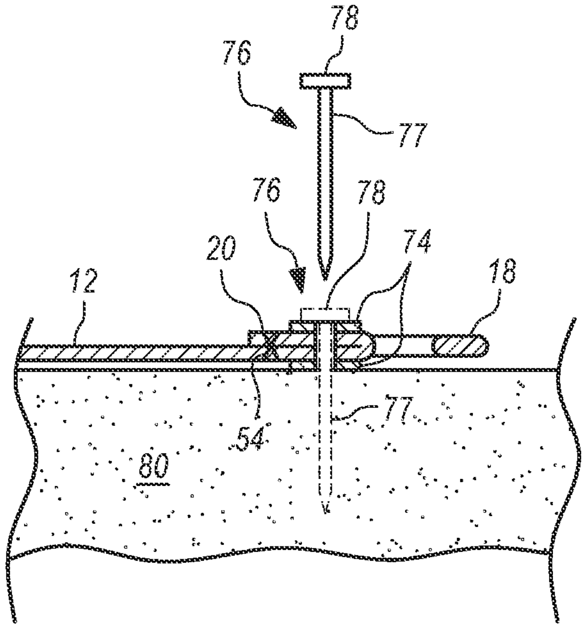
FIG. 4B is a partial side view of the apparatus having a grommet extending through the flexible sheet of material for receiving a stake.

FIG. 4B is a partial side view of the main portion 12 of the apparatus 10 illustrating the grommet 74 extending through the hem 20 near the perimeter edge of the main portion 12. A stake 76 has a shaft 77 and a head 78, wherein the shaft is sized to pass through the hole in the grommet 74. As shown in dashed lines, the stake 76 has been pushed through the grommet 74 until the head 78 comes to rest against the grommet 74 and the shaft 77 has been firmly received in a soil bed or similar substrate.

Figure 5A:
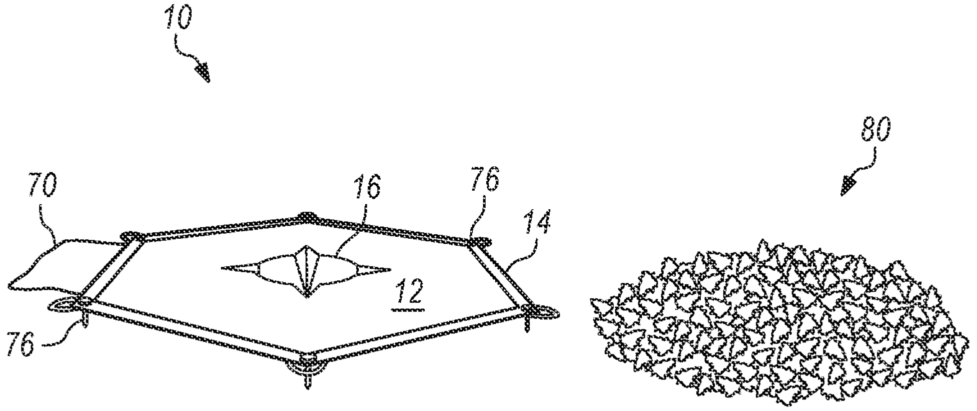
FIG. 5A is a perspective view the apparatus in a deployed condition adjacent a pile of debris.

FIG. 5A is a perspective view of the apparatus 10 in a deployed condition adjacent a pile of debris 80. Using weights and/or stakes, the main portion 12 is held in a flat, laid-open condition. For example, when raking the pile of debris 80 onto the main portion 12 it may be beneficial to make sure that the perimeter edge 14 nearest the pile of leaves is somewhat flat to the ground. The weights and/or stakes can be used to ensure that the edge 14 stays down against the ground. The weights and/or stakes are also important if the debris being raked is heavy or if a leaf blower is being used.

Figure 5B:
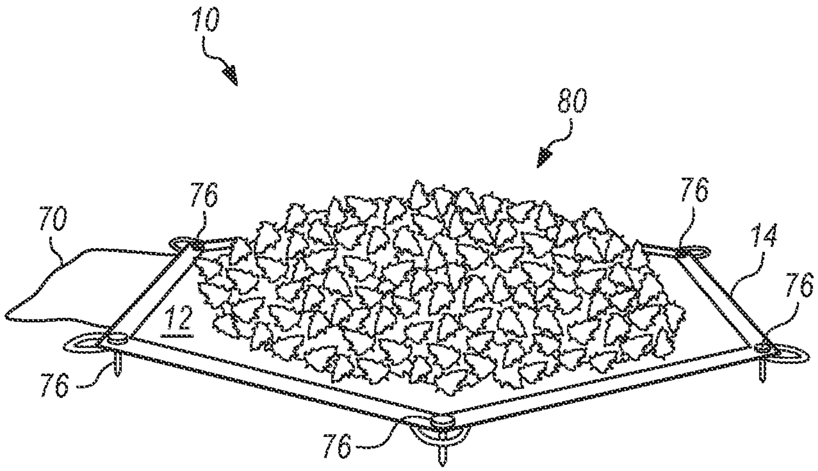
FIG. 5B is a perspective view of the apparatus after the debris has been moved on top of the deployed apparatus.

FIG. 5B is a perspective view of the apparatus 10 after the debris 80 has been moved on top of the main portion 12. The debris 80 may be at least somewhat centered onto the main portion 12, such as with the center of the pile over the central opening 16 (not shown; see FIG. 5A). At this point the stakes 76, if any, may be removed.

Figure 5C:
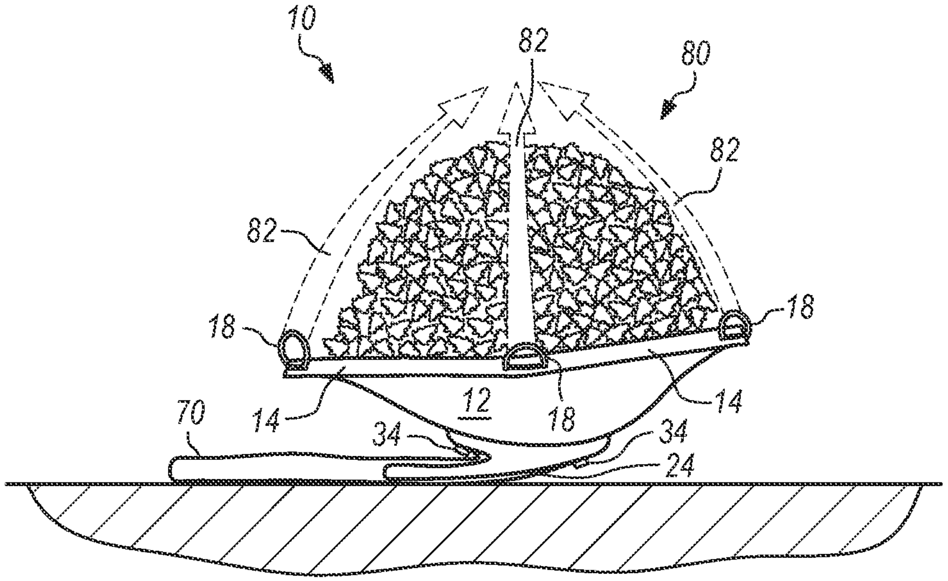
FIG. 5C is a perspective view of the apparatus with the edges being lifted upward by handles so that the main portion of the flexible sheet extends around the side and/or top of the debris.

FIG. 5C is a perspective view of the apparatus 10 with the perimeter edges 14 being lifted upward by the handles 18 so that the main portion 12 extends around the side and/or top of the debris. For example, a user may lift all of the handles 18 (see dashed arrows 82) until all the handles 18 and edges 14 are pulled together at the top. Note that the bag 70 remains secured to the discharge chute 24 by the clips 34 beneath the main portion 12 and the debris 80.

Figure 5D:
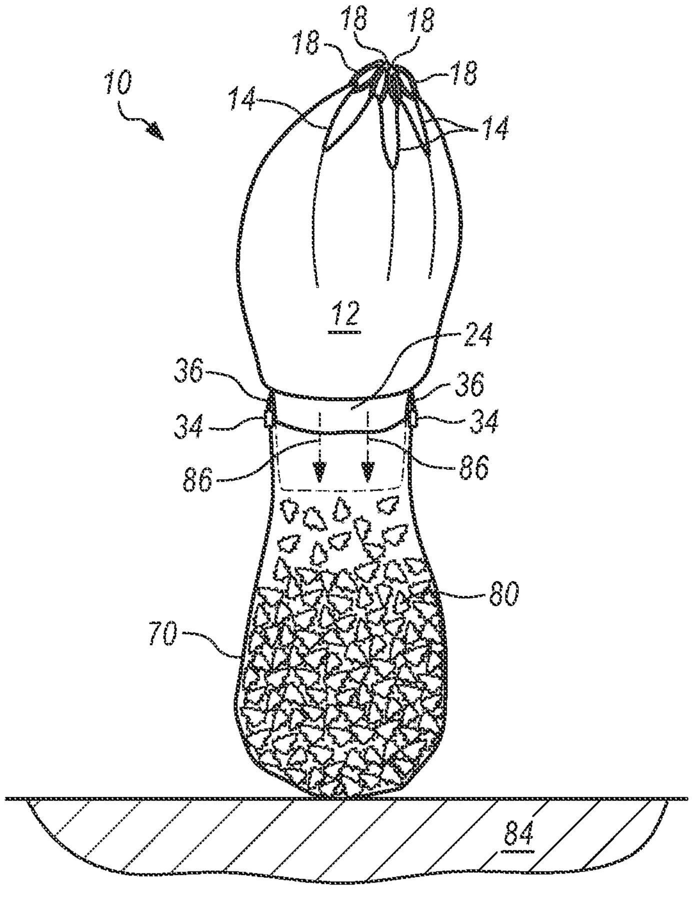
FIG. 5D is a perspective view of the apparatus lifted off the ground so that the debris passes through the discharge chute into the bag.

FIG. 5D is a perspective view of the apparatus 10 lifted off the ground 84 so that the debris 80 passes through the discharge chute 24 (see dashed arrows 86) under the force of gravity into the bag 70. With a grip on the gathered handles 18, the apparatus 10 may be gently shaken to assist the debris within the main portion 12 to fall through the discharge chute 24 into the bag 70. Notice that the discharge chute 24 and at least the upper portion of the bag 70 have been lifted off the ground. The discharge chute 24 is pushed open wide by the debris 80 passing through the chute 24, and the bag 70 is lifted due to being connected to the apparatus 10 by the clips 34 and strap 36. As this happens the materials will continue to settle through the discharge chute and into the attached bag 70. The bottom of the bag 70 may remain on the ground 84 throughout this lifting process, if desired to reduce the amount of weight lifted and avoid excessive stress on the points where the bag 70 is attached to the clips 34. Once the debris 80 has been transferred into the bag 70, the user can use a free hand to detach the clips 34 from the top of the bag 70 and pull the discharge chute 24 out of the bag 70. Setting aside the apparatus 10, the user may then tie off the open top of the bag or add any remaining leftover debris from the area before closing the bag.

Figure 6:
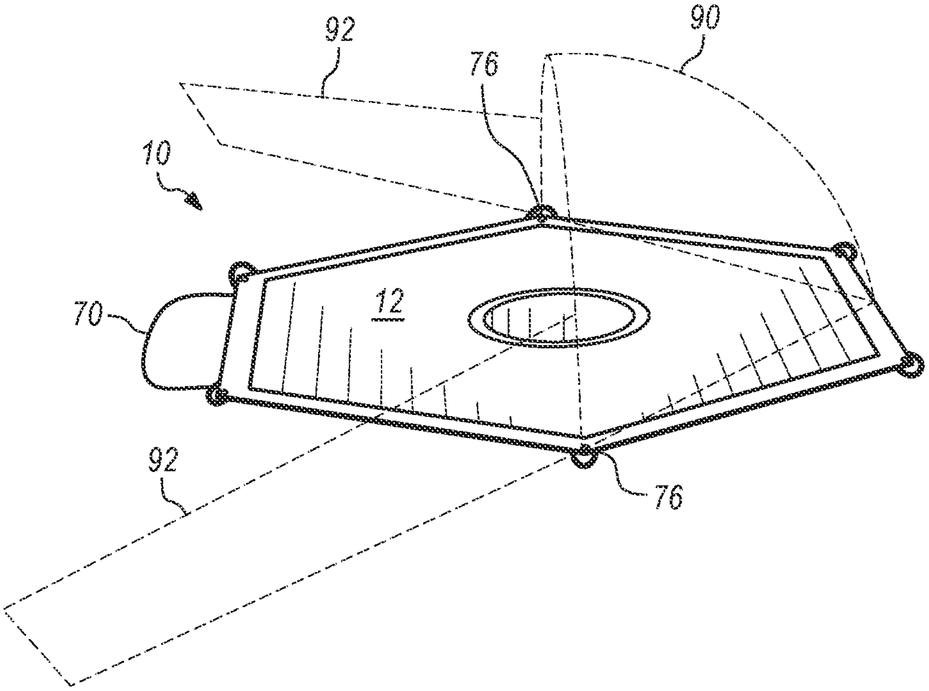
FIG. 6 is a perspective view of the apparatus laid out on the ground with a hood or backstop to facilitate use of the apparatus in conjunction with a leaf blower.

FIG. 6 is a perspective view of the apparatus 10 laid out on the ground as in FIG. 5A, but with a hood, tent or backstop 90 (shown in dashed lines) to facilitate use of the apparatus in conjunction with a leaf blower. For example, the hood 90 may be temporarily attached to the apparatus 10 using a first and second stake 76. Accordingly, a leaf blower may direct leaves into hood 90 such that the leaves will be retained in a pile on top of the main portion 12. Once the blowing is complete, the hood 90 may be removed and the apparatus 10 can be used in the normal manner as described in reference to FIGS. 5B-5D. Optionally, the hood 90 may have two long extensions 92 that extend at a forward angle from either side of the hood 90, where each extension 92 may be separately staked to the ground. These will act as catchers to help direct leaves into the hood 90 above the main portion 12.

Figure 7:
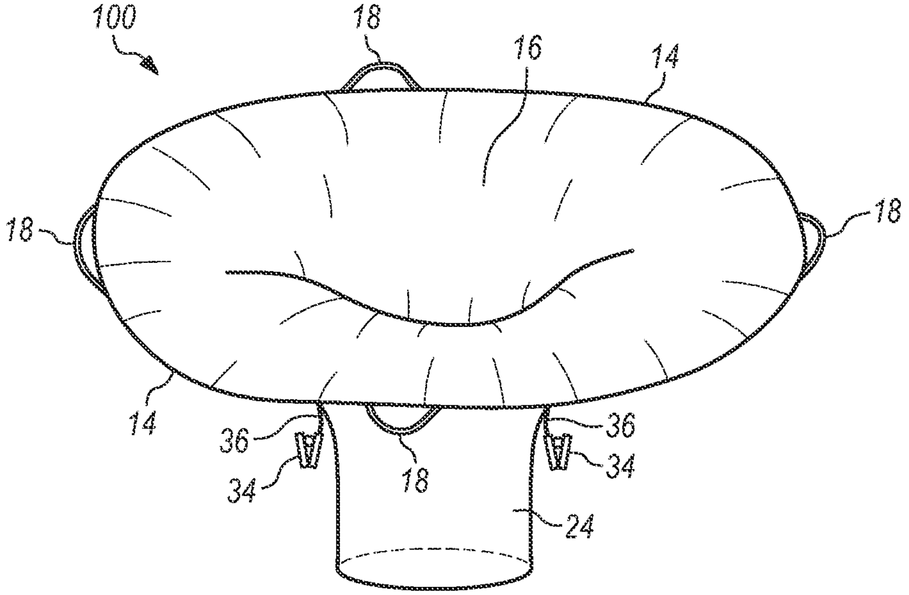
FIG. 7 is a perspective view of the apparatus formed as a molded continuous sheet.

FIG. 7 is a perspective view of an apparatus 100 formed as a molded continuous sheet. For example, the apparatus 100 may be made by a thermoforming process to create the curved profile of the apparatus. While the appearance may be distinctive, the apparatus 100 may include the same features and elements as the apparatus 10. For example, the apparatus 100 includes a perimeter edge 14, a plurality of handles 18, a central opening 16, a discharge chute 24, and clips 34 secured by a strap 36. So, despite the somewhat different construction which may eliminate numerous sewing seams, the apparatus 100 may be used in same manner as described for the apparatus 10.

Figure 8A:
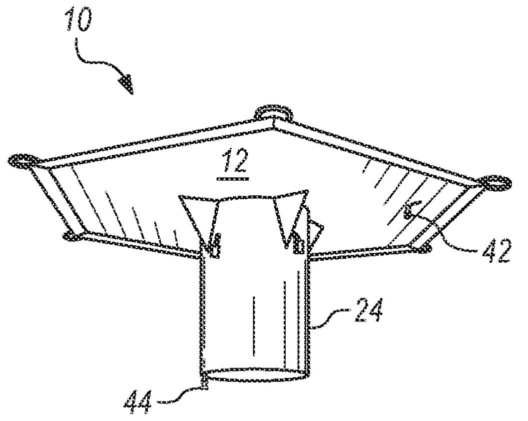
FIGS. 8A-D illustrates the use of the apparatus to carry a load of material from one location to another.
Figure 8B:
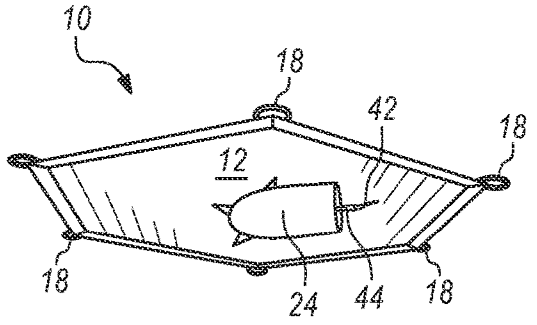
Figure 8C:
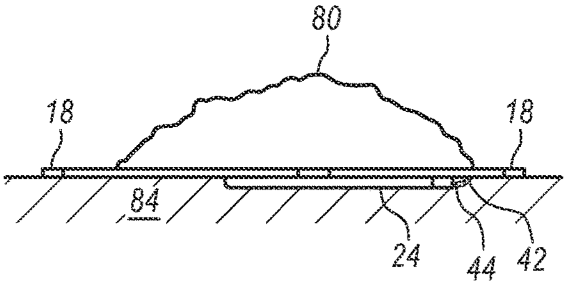
Figure 8D:
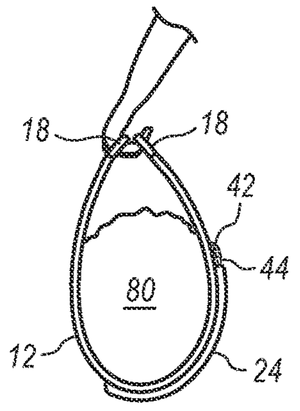

FIGS. 8A-D illustrate the use of the apparatus 10 to carry a load of debris or other solid material from one location to another without use of a bag. FIG. 8A is the same as FIG. 1B, but is duplicated here to illustrate the use of the receiving component 44 and the insertion component 42 of the side release buckle. In FIG. 8B, the discharge chute 24 is folded to the side until the receiving component 44 can be attached to the insertion component 42. Of course, other types of fasteners may be used as well. However, the carabiner and eyelet hold the discharge chute 24 in a closed condition such that debris or other solid materials cannot readily pass therethrough. Also, no bag is attached to the clips 34. In FIG. 8C, the apparatus 10 is spread out on the ground 84 with the main portion 12 facing upward, as previously described, and debris 80 is piled on top. FIG. 8D, is a schematic diagram illustrating that a user has gathered the handles 18 and lifted the apparatus off the ground to carry the debris to another location. The debris may be offloaded either by simply letting go of several handles 18 while still lifting on one handle or by detaching the receiving component 44 from the insertion component 42, such that the debris 80 will fall through the discharge chute 24 into a new pile or into a dumpster. Optionally, the receiving component may be attached to either the discharge chute or the bottom of the flexible sheet, and the insertion component may be attached to the other of the discharge chut or the bottom of the flexible sheet.

Figure 9A:
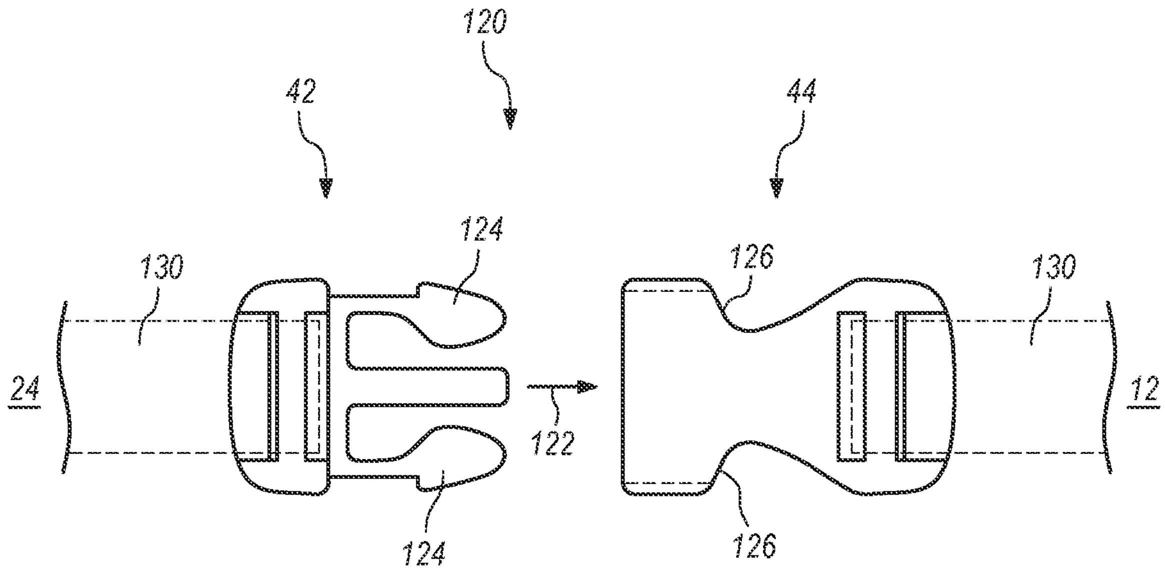
FIGS. 9A-B are plan views of a side release buckle having an insertion end and a hook end in a disconnected condition and a connected condition, respectively.
Figure 9B:
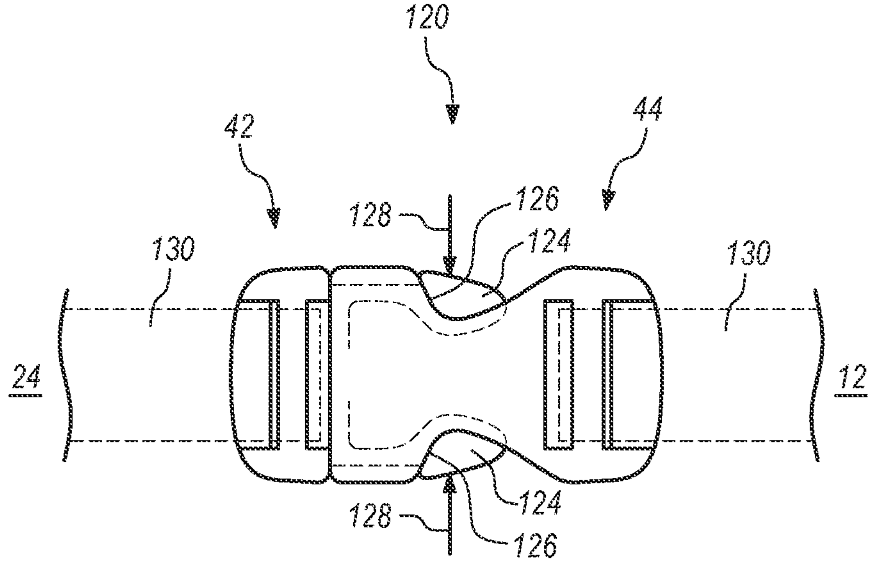

FIGS. 9A-B are plan views of a side release buckle 120 having an insertion component 42 and a receiving component 44 in a disconnected condition and a connected condition, respectively. In the disconnected condition illustrated in FIG. 9A, the insertion component 42 is aligned for insertion (see arrow 122) into an open end of the receiving component 44. The insertion component 42 has a pair of prongs 124 that may be inwardly biased during insertion into the receiving component 44 and then snap outward upon reaching a seat 126. In the connected condition illustrated in FIG. 9B, the prongs 124 of the insertion component 42 are received in the seats 126 of the receiving component 44. The prongs 124 are thus secured in the seats 126 to resist separation when placed in tension by the straps 130 that are connected to the insertion component 42 and the receiving component 44. When a user desires to separate the insertion component 42 from the receiving component 44, the prongs 124 may be squeezed or pressed inward (see arrows 128) toward each other until prongs 124 are no longer secured in the seats 126 and may be withdrawn from the receiving component 44.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. An apparatus, comprising:

a flexible sheet of material having a perimeter edge and a central opening forming a discharge chute; and first and second clips coupled to the flexible sheet for securing an open end of a bag around an outer circumferential surface of the discharge chute, wherein the first and second clips are spaced apart about the outer circumferential surface of the discharge chute.

2. The apparatus of claim 1, further comprising:

three or more handles secured along the perimeter edge of the flexible sheet of material.

3. The apparatus of claim 2, wherein the flexible sheet is configured to direct solid matter through the discharge chute in response to lifting the flexible sheet by the three or more handles.

4. The apparatus of claim 3, wherein the three or more handles are an equal radial distance from a central axis of the discharge chute.

5. The apparatus of claim 4, characterized in that solid matter placed onto the flexible sheet is directed through the discharge chute and into the bag in response to lifting the handles.

6. The apparatus of claim 1, wherein the flexible sheet includes a first sheet portion from the perimeter edge to the central opening and a second sheet portion, wherein the second sheet portion forms the discharge chute and has a proximal end that is connected to the first sheet portion along the central opening, wherein the first section can be laid out flat on a support surface with the second section folded under the first section.

7. The apparatus of claim 6, wherein the first sheet portion is connected to the second sheet portion by sewing and/or thermal bonding.

8. The apparatus of claim 6, wherein the flexible sheet includes a plurality a pleats that are disposed along a circumference of the central opening, wherein each pleat extends at an acute angle with the first section and at an acute angle with the discharge chute.

9. The apparatus of claim 1, wherein the flexible sheet is selected from plastic, ripstop nylon, polytarp, burlap, canvas, and combinations thereof.

10. The apparatus of claim 9, wherein the flexible sheet is water resistant.

11. The apparatus of claim 1, wherein the flexible sheet is seamless and has a smooth transition in contour from a first flat area along the perimeter edge to the discharge chute.

12. The apparatus of claim 1, further comprising:

a plurality of weights secured to the perimeter edge of the flexible sheet of material.

13. The apparatus of claim 1, further comprising:

a plurality of grommets secured through the flexible sheet along the perimeter edge; and a plurality of stakes receivable through the grommets for securing the flexible sheet to a soil bed.

14. The apparatus of claim 1, where the discharge chute has a distal end that extends at least six inches beyond the first and second clips.

15. The apparatus of claim 1, further comprising:

a plurality of handles secured along the perimeter edge of the flexible sheet of material, wherein the perimeter edge of the flexible sheet forms a regular polygon having a plurality of edges and a plurality of vertices, wherein one of the handles is secured to the perimeter edge of the flexible sheet at each of the vertices.

16. The apparatus of claim 15, further comprising:

a hem formed along each of the edges the polygon; and a cord extending through the hem, wherein the cord extends from the hem at each of the vertices to form one of the handles.

17. The apparatus of claim 1, wherein the first and second clips are coupled to the flexible sheet by a tie selected from a strap, cord, and combinations thereof.

18. The apparatus of claim 1, further comprising:

at least one additional clip coupled to the flexible sheet for securing an open end of a bag around an outer circumferential surface of the discharge chute, wherein each of the clips are spaced about the circumference of the discharge chute at substantially equal spacings.

19. The apparatus of claim 1, further comprising:

a concave hood selectively secureable to the flexible sheet.

20. An apparatus, comprising:

a flexible sheet of material having a perimeter edge and a central opening forming a discharge chute;

first and second clips coupled to the flexible sheet for securing an open end of a bag around an outer circumferential surface of the discharge chute, wherein the first and second clips are spaced apart about the outer circumferential surface of the discharge chute;

a first fastener connected to a first side of the discharge chute; and a second fastener connected to the flexible sheet at a point that is radially outward of the discharge chute and opposite the first side of the discharge chute, wherein the first fastener is manually attachable to the second fastener to close off the discharge chute, and wherein the first fastener is manually detachable from the second fastener to open up the discharge chute.

* * * * *